US012686440B2

(12) United States Patent
Bujak et al.

(10) Patent No.: US 12,686,440 B2
(45) Date of Patent: Jul. 21, 2026

(54) AUXILIARY FRAME FOR A VEHICLE

(71) Applicant: AUDI AG, Ingolstadt (DE)

(72) Inventors: Marek Bujak, Wellheim (DE); Jörg Eickstädt, Gaimersheim (DE); Dominik Mohrlock, Buxheim (DE); Stefan Rugies, Ingolstadt (DE); Andreas Weber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/730,040

(22) PCT Filed: Feb. 6, 2023

(86) PCT No.: PCT/EP2023/052863
§ 371 (c)(1),
(2) Date: Jul. 18, 2024

(87) PCT Pub. No.: WO2023/152090
PCT Pub. Date: Aug. 17, 2023

(65) Prior Publication Data
US 2025/0115298 A1 Apr. 10, 2025

(30) Foreign Application Priority Data
Feb. 11, 2022 (DE) .......................... 102022103312.0

(51) Int. Cl.
B62D 21/11 (2006.01)
(52) U.S. Cl.
CPC ................................... B62D 21/11 (2013.01)

(58) Field of Classification Search
CPC ...................................................... B62D 21/11
See application file for complete search history.

(56) References Cited

U.S. PATENT DOCUMENTS

| | | | |
|---|---|---|---|
| 2006/0181071 A1 | 8/2006 | Mitsui et al. | |
| 2014/0145423 A1* | 5/2014 | Isakiewitsch .......... | B62D 21/11 280/781 |
| 2015/0076866 A1* | 3/2015 | Mohrlock ................ | B60G 7/02 296/203.01 |

(Continued)

FOREIGN PATENT DOCUMENTS

| | | |
|---|---|---|
| CN | 201424053 Y | 3/2010 |
| CN | 201941845 U | 8/2011 |

(Continued)

OTHER PUBLICATIONS

Office Action issued on Nov. 9, 2022, in corresponding German Application No. 102022103312.0, 10 pages.

(Continued)

*Primary Examiner* — Nicole T Verley
(74) *Attorney, Agent, or Firm* — Maier & Maier, PLLC

(57) ABSTRACT

A subframe for a vehicle, with a unit mounting, in which a unit support is pivotably connected to a unit bearing on the subframe about a bearing axis. The unit bearing is axially fastened on both sides to a respective bracket wing of a bearing bracket of the subframe. The unit bearing is arranged in an inner corner region of the subframe, at which a first subframe member and a second subframe member converge. One of the bracket wings is formed directly by a wall of the first subframe member.

17 Claims, 4 Drawing Sheets

(56)                  References Cited

U.S. PATENT DOCUMENTS

| | | | | |
|---|---|---|---|---|
| 2017/0015264 A1* | 1/2017 | Mohrlock | ............... | B60G 3/20 |
| 2018/0194183 A1* | 7/2018 | Mohrlock | .............. | B60G 7/006 |
| 2024/0075984 A1* | 3/2024 | Smith | ................... | B62D 21/11 |

FOREIGN PATENT DOCUMENTS

| | | | | | |
|---|---|---|---|---|---|
| CN | 106697054 A | * | 5/2017 | .............. | B60K 1/00 |
| CN | 208746082 U | | 4/2019 | | |
| DE | 4135361 A1 | | 4/1993 | | |
| DE | 19529334 C2 | * | 6/1997 | ............. | B60G 99/00 |
| DE | 19909945 C1 | | 10/2000 | | |
| DE | 10235110 A1 | | 2/2004 | | |
| DE | 102008010551 A1 | * | 8/2009 | ............. | B62D 21/11 |
| DE | 102013007473 A1 | | 10/2014 | | |
| DE | 102016000274 A1 | * | 7/2016 | ........... | B62D 21/155 |
| DE | 102017128033 A1 | * | 5/2018 | ............. | B60G 7/008 |
| DE | 102018219905 A1 | * | 5/2020 | ............. | B62D 21/11 |
| DE | 102018220728 A1 | | 6/2020 | | |
| DE | 102019124348 A1 | | 3/2021 | | |
| EP | 0530594 A1 | * | 3/1993 | ........... | B60G 21/055 |
| EP | 1035003 A2 | * | 9/2000 | .............. | B60G 7/02 |
| EP | 2093131 A2 | | 8/2009 | | |
| ES | 1013462 U | * | 12/1990 | ............. | B62D 21/11 |
| JP | 3690713 B2 | * | 8/2005 | ............. | B62D 21/11 |
| JP | 2007237756 A | * | 9/2007 | | |
| JP | 2022154761 A | * | 10/2022 | | |
| KR | 101498827 B1 | | 3/2015 | | |
| KR | 20210141202 A | * | 11/2021 | ............. | B60G 11/14 |
| KR | 20240045429 A | * | 4/2024 | ........... | B62D 27/023 |
| WO | WO-2005095182 A1 | * | 10/2005 | .............. | B60G 7/02 |

OTHER PUBLICATIONS

International Preliminary Report on Patentability issued on Jan. 24, 2024, in corresponding International Application No. PCT/EP2023/052863, 37 pages.

International Search Report and Written Opinion issued on May 24, 2023, in corresponding International Application No. PCT/EP2023/052863, 16 pages.

\* cited by examiner

AUXILIARY FRAME FOR A VEHICLE

FIELD

The invention relates to a subframe for a vehicle.

BACKGROUND

In the case of an electrified vehicle axle for a two-track vehicle, the drive unit can consist of an electric motor and a gearbox via which the electric motor drives on flange shafts that lead to the vehicle wheels. The drive unit is supported on a subframe in a three- or four-point mounting. This in turn is mounted to the vehicle body via subframe bearings.

In a generic drive device, the drive unit is supported on a longitudinal member or cross member of a subframe via at least one unit support. The longitudinal or cross member is designed as a hollow member that defines a cavity that is closed in cross-section by a surrounding hollow member wall.

In the prior art, bearing brackets are attached to such a subframe as separate components, to which the unit support can be connected. Such a type of connection leads to a high package density in the region of the vehicle axle, where the brackets limit the available installation space for the drive unit, as well as to a component effort when assembling the vehicle axle. In addition, separate tools, additional manufacturing facilities and production time are required to weld the brackets to the subframe.

The brackets can also weaken the fatigue strength of the subframe. Furthermore, the position of the brackets may have to be selected in such a way that separate dismantling of the drive unit is no longer possible.

A subframe for motor vehicles is known from DE 102 35 110 A1. From DE 10 2013 007 473 A1 a suspension device for drive units of motor vehicles is known. From DE 10 2019 124 348 A1 a bearing arrangement of a component on an axle support for a vehicle is known.

SUMMARY

The object of the invention is to provide a subframe for a vehicle by means of which the package density and the component required during assembly of the subframe can be reduced in a structurally simple manner.

The invention is based on a subframe for a vehicle, which has a unit mounting. In the unit mounting, a unit support is pivotably connected to a unit bearing on the subframe about a bearing axis. The unit bearing is axially attached on both sides to a bracket wing of a bearing bracket of the subframe. According to the characterizing part of claim 1, the unit bearing is arranged in a space-efficient manner in an inner corner region of the subframe, where a first subframe member and a second subframe member converge. One of the bracket wings is formed directly by a frame inner side of the first subframe member. The other bracket wing, on the other hand, cannot be directly integrated into the subframe member, but rather can be designed as a separate bracket wing component that is connected to the second subframe member. In this way, the bearing bracket is provided with reduced installation space requirements and with reduced component requirements.

The separate bracket wing component, which is connected to the second subframe member, can be spaced from the first subframe member via a bearing space. The unit bearing is positioned in the bearing space.

In a preferred embodiment, the first subframe member can be a subframe cross member, while the second subframe member is a subframe longitudinal member. The subframe cross member and the subframe longitudinal member converge at a corner node of the subframe. The unit bearing is located in the inner corner region of this corner node.

In a technical implementation, the first subframe member, in which a bracket wing is directly integrated, can be designed as a hollow member that delimits a hollow space. The cavity is closed by a hollow member wall when viewed in the hollow member cross-section. In addition, the first subframe member can have an access opening on the frame outer side of the hollow member wall, through which the unit bearing can be mounted or dismounted.

The bearing axis of the unit bearing, around which the unit support is pivoted, can be defined by a bearing pin. This can be mounted axially on both sides of the unit bearing in the respective bracket wing of the bearing bracket. With regard to a compact and component-rigid bracket wing geometry, the bracket wing is designed as a U-profile part according to a further aspect of the invention. The U-profile part has a base wall in which the bearing pin is mounted and support legs angled from it which support the base wall relative to the subframe. The two support legs protrude axially outwards from the base wall. Preferably, the bracket wing is connected to the subframe at its base wall bottom edge and/or at its support leg bottom edge. The connection can preferably be made by welding.

With regard to a compact and component-rigid design, the base wall can be triangular in shape, with base wall peripheral edges that converge in a triangular shape starting from the base wall bottom edge at a preferably rounded base wall vertex. A bearing opening for the bearing pin is formed in the region of the base wall apex.

In a specific design variant, the edge profile of the respective base wall peripheral edge can be divided in particular into a transition edge, at which the respective support leg is angled away from the base wall, and a free peripheral edge that extends up to the base wall apex.

A rigid connection of the bracket wing to the subframe is of particular importance. Against this background, at least one of the support legs of the bracket wing can be extended with a tab. This can protrude beyond the base wall bottom edge of the bracket wing. The base wall bottom edge can be connected to one subframe side, while the support leg tab can be connected to another differently oriented subframe side. For example, the base wall bottom edge is connected to an inner side of the frame, while the support leg tab is connected to a lower side of the frame.

In the triangular geometry of the bearing bracket described above, the two support legs are not aligned parallel to each other, but rather run towards each other in the direction of the base wall apex. This results in a particularly compact and rigid bracket wing geometry. With regard to simple production, it is preferred if the bracket wing is realized as a sheet metal formed part, in which a flat sheet metal blank is first provided, which is formed into the bracket wing in a cutting and forming operation.

According to a further aspect of the invention, the subframe member, that is to say a subframe cross member or a subframe longitudinal member, can be designed with a reduced cross section with a trough-shaped mounting recess in which the bracket wings are arranged. In this way, operating forces that occur can be diverted from the unit support via the unit bearing in a component-stable manner towards the subframe, utilizing the stability of the respective subframe member gained with the help of the trough-shaped mounting recess.

In common practice, the subframe member can be a hollow member that delimits a cavity that, viewed in the hollow member cross-section, is closed by a hollow member wall. The trough-shaped mounting recess is formed in the closed hollow member wall. The hollow member wall may have a rectangular cross-section in which an upper horizontal hollow member top wall and a lower horizontal hollow member bottom wall are connected to vertical hollow member side walls at transition edges.

The trough-shaped mounting recess is preferably positioned as follows: The contour of one of the two transition edges can be interrupted by the trough-shaped mounting recess. In this case, a recess bottom of the mounting recess can merge at a recess edge into the side wall and into the bottom or top wall of the subframe member. In this way, a particularly rigid support base for the bearing bracket on the subframe is provided. The connection strength between the bracket wing and the subframe member can be further increased as follows: the base wall bottom edge of the bracket wing can be connected to the trough bottom. In contrast, the support leg tab can overlap the edge of the mounting recess and be connected to the side wall and/or the bottom or top wall of the hollow member.

BRIEF DESCRIPTION OF THE FIGURES

Exemplary embodiments of the invention are described in the following on the basis of the appended figures.

In particular.

DETAILED DESCRIPTION

Figure 1:
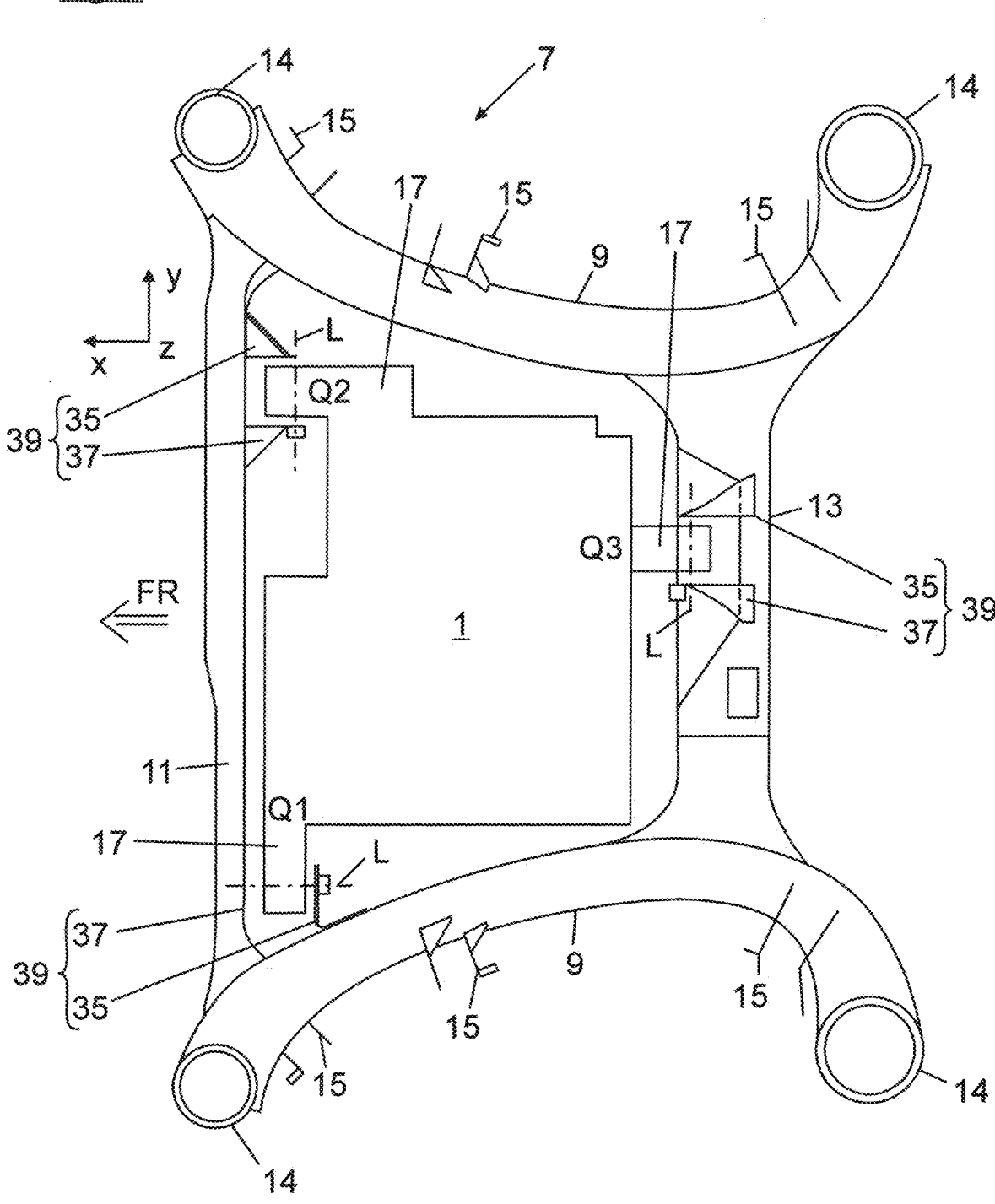
FIG. 1 shows a view from above of a subframe for a vehicle with a drive unit mounted thereon.

In FIG. 1, an electrified vehicle axle for a two-track vehicle is indicated to the extent that it is necessary for understanding the invention. In FIG. 1, the vehicle axle has a drive unit 1, which consists, for example, of an electric motor and a transmission. The drive unit 1 is connected in a three-point mounting to the upper side of a subframe 7 of the vehicle. In FIG. 1, the subframe 7 has two lateral subframe longitudinal members 9, which are connected at front and rear corner nodes to front and rear subframe cross members 11, 13, respectively. According to FIG. 1, bearing eyes 14 for subframe bearings (not shown) are formed at the corner regions of the subframe 9, via which the subframe 7 can be mounted on the vehicle body. On the outer sides of the vehicle, the two subframe longitudinal members 9 each have connection points 15 for chassis links (not shown).

Figure 2:
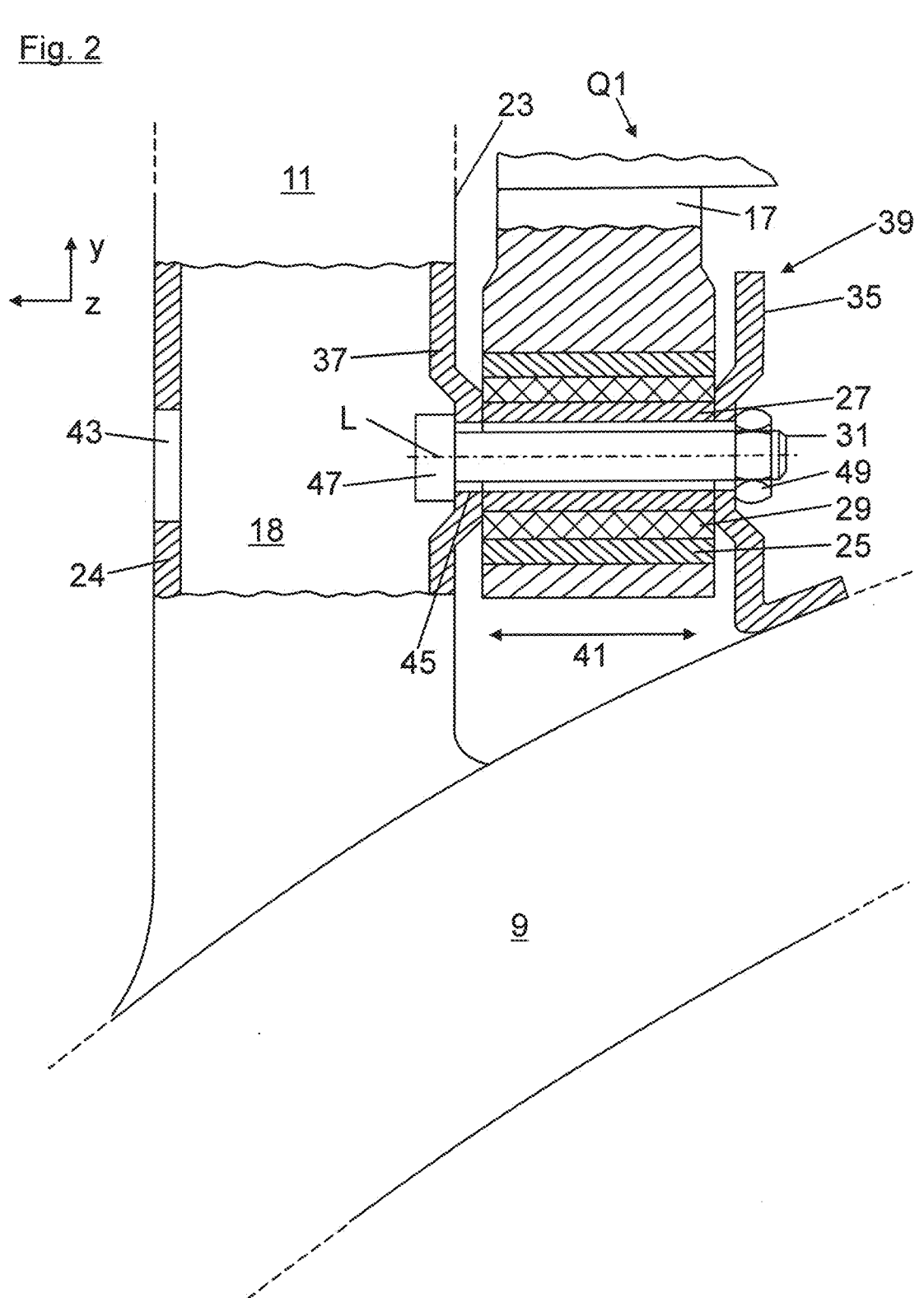
FIG. 2 shows a view of the unit mountings on the subframe.

In FIG. 1, the drive unit 1 is mounted on unit supports 17 of the drive unit 1 via two front unit bearings Q1, Q2 on the front subframe cross member 11 and via a further unit bearing Q3 on the rear subframe cross member 13. The subframe cross members 11, 13 as well as the two subframe longitudinal members 9 are each designed as hollow members which delimit a hollow space 18 (FIG. 2). Viewed in the hollow member cross-section, this is closed by a surrounding rectangular hollow member wall. According to the figures, the hollow member wall consists of an upper, horizontal cover wall 19 (FIG. 4) and a lower, horizontal bottom wall 21 (FIG. 3), which are connected at transition edges 22 (FIGS. 3 and 4) to a vertical inner side wall 23 (FIG. 3) and a vertical outer side wall 24 (FIG. 2).

Each of the unit bearings Q1, Q2, Q3 is designed as a rubber-metal sleeve bearing, which is shown in detail only in FIG. 2. Accordingly, the rubber-metal sleeve bearing consists of a radially outer sleeve 25 and a radially inner, sleeve-shaped bearing core 27, between which a vibration-damping elastomer body 29 is arranged. A bearing pin 31 is guided through the bearing core 27 of the unit bearings Q1, Q2, Q3, which defines a bearing axis L about which a unit support 17 of the drive unit 1 is pivotably connected. The bearing pin 31 is mounted axially on both sides of the unit bearing Q1, Q2, Q3 in a bracket wing 35, 37 of a bearing bracket 39 which is connected to the subframe 7.

The bearing brackets 39 of the unit bearings Q1, Q2, Q3 are realized with different component geometries: Thus, the unit bearing Q1 according to FIG. 2 is arranged in an inner corner region of the subframe 7, which is spanned between the front subframe cross member 11 and the subframe longitudinal member 9. On the unit bearing Q1, the bearing bracket 39 has a bracket wing 35 implemented as a separate bracket wing component, which is welded to the subframe longitudinal member 9. In contrast, the other bracket wing 37 is not realized as a separate bracket wing component, but rather as a direct and integral part of the inner side wall 23 of the front subframe cross member 11. The two bracket wings 35, 37 are spaced apart from one another via a bearing space 41 in which the unit bearing Q1 is arranged. An access opening 43 is formed on the outer side wall 24 of the front subframe cross member 11, via which the unit bearing Q1 can be mounted/removed. According to FIG. 2, the bearing pin 31 is guided through a pin hole 45 of the inner side wall 23 of the front subframe cross member 11 and is supported with its pin head 47 on the opening peripheral region of the pin hole 45. A weld nut 49 is welded to the bracket wing 35, to which the pin tip of the bearing pin 31 is screwed.

Figure 3:
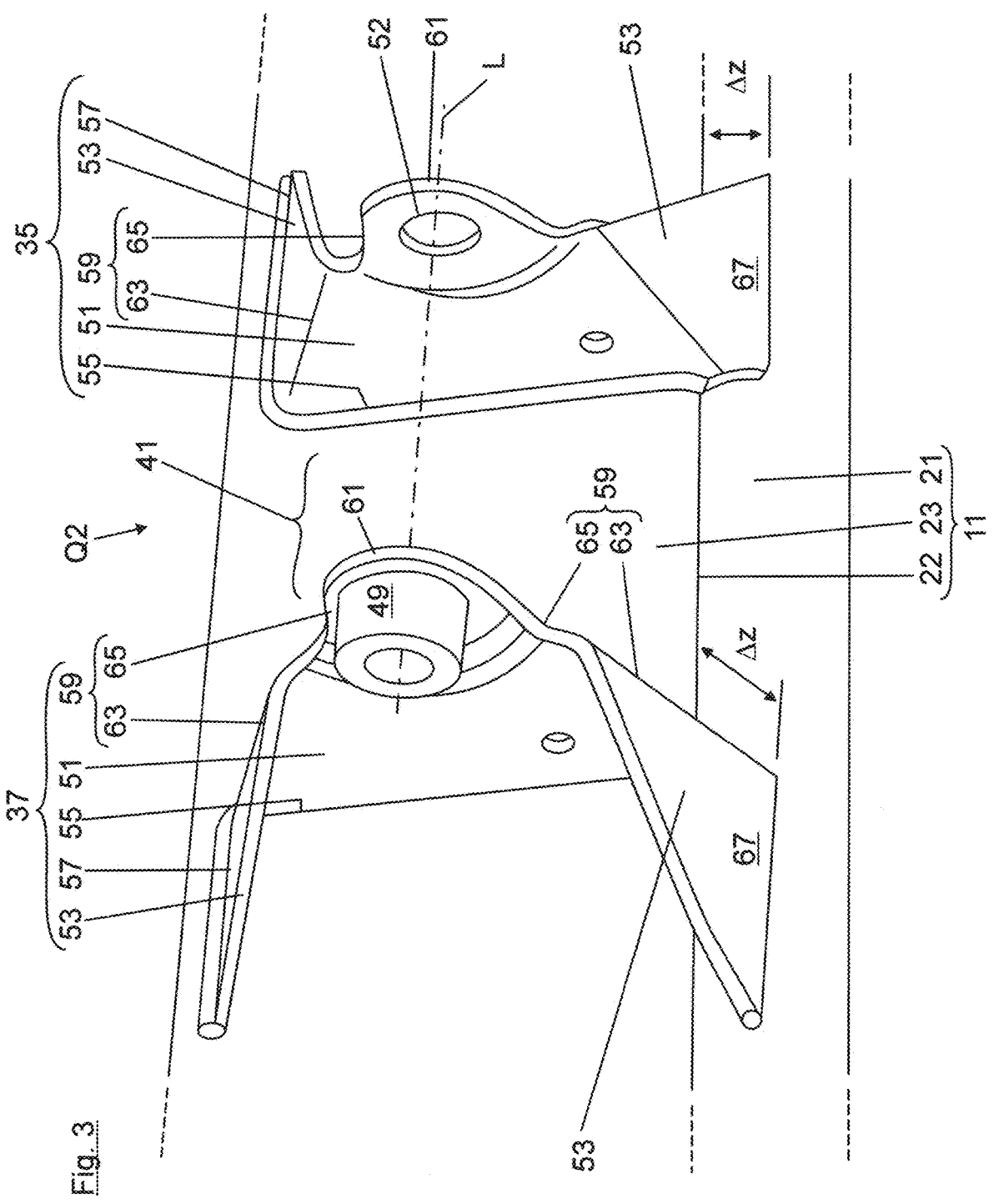
FIG. 3 shows a view of the unit mountings on the subframe.

FIG. 3 shows the bearing bracket 39 of the unit bearing Q2. Accordingly, the two bracket wings 35, 37 are realized as separate bracket wing sheet metal parts, which are designed in a compact and component-rigid bracket wing geometry. Each of the two bracket wings 35, 37 is designed as a U-profile part, with a base wall 51, in which the bearing pin 31 (not shown) is guided through a pin hole 52, and with support legs 53 angled therefrom, which support the base wall 51 on the inner side wall 23 of the subframe 7. The respective bracket wing 35, 37 is welded to the subframe 7 at its base wall bottom edge 55 and at its support leg bottom edge 57. As can be seen from FIG. 3, the base wall 51 is triangular in shape. Their base wall edges 59 converge in a triangular shape, starting from the base wall bottom edge 55, at a rounded base wall vertex 61, in the region of which the pin hole 52 is formed. The edge profile of the respective base wall edge 59 is divided into a transition edge 63, at which the base wall 51 merges into the respective support legs 53, and into a free edge 65, which extends to the base wall apex 61.

In FIG. 3, the lower support legs 53 of the two bracket wings 35, 37 are each extended with a sheet metal tab 67 which projects beyond the base wall bottom edge 55 with a projection Δz. According to FIG. 3, the base wall bottom edge 55 is welded to an inner side wall 23 of the front subframe cross member 11, while the support leg sheet metal tab 67 engages around the lower subframe transition edge 22 and is connected to the bottom wall 21 of the front subframe cross member 11.

As can be seen from FIG. 3, the two support legs 53 of the bracket wing 35, 37 are not aligned parallel to each other, but are rather inclined towards each other. In this way, a particularly compact and component-rigid bracket wing geometry is possible.

Figure 4:
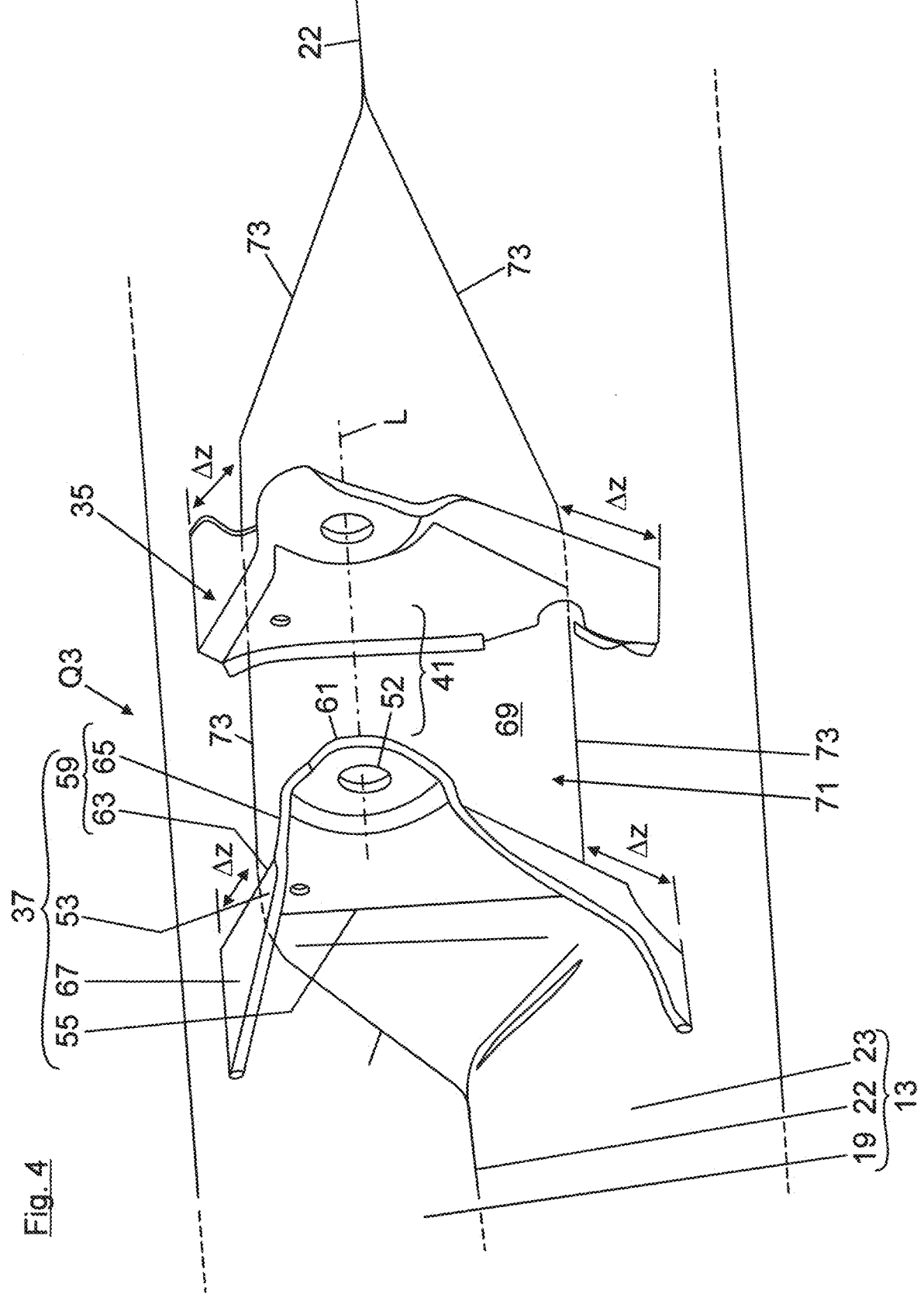
FIG. 4 shows a view of the unit mountings on the subframe.

FIG. 4 shows the connection of the unit support 17 via the third unit bearing Q3 to the rear subframe cross member 13. Accordingly, the rear subframe cross member 13 has a trough-shaped mounting recess 71 in which the two bracket wings 35, 37 are arranged. The two bracket wings 35, 37 have approximately the same geometry as the two bracket wings 35, 37 of unit bearing Q2.

The trough-shaped mounting recess 71 is formed in the hollow member wall without opening the cavity 18 of the rear subframe cross member 13 to the outside. As can be seen from FIG. 4, the contour of the upper transition edge 22 of the rear subframe cross member 13 is interrupted by the trough-shaped mounting recess 71. In this case, a trough bottom 69 of the mounting recess 71 merges at a trough edge 73 into the inner side wall 23 and into the upper top wall 19 of the rear subframe cross member 13. In addition, the two support legs 53 of the bracket wing 35, 37 are each extended with a support leg sheet metal tab 67, which overlaps the trough edge 73 and is connected to the inner side wall 23 and the cover wall 19 of the rear subframe cross member 13. In contrast, the base wall bottom edge 55 of the bracket wing 35, 37 is welded to the trough bottom 69.

LIST OF REFERENCE NUMERALS

1 drive unit
7 subframe
9 subframe longitudinal member
11,13 front and rear subframe cross members
14 bearing eyes
15 connection points
17 unit support
18 cavity
19 top wall
21 bottom wall
22 transition edge
23 inner side wall
24 outer side wall
25 outer sleeve
27 bearing core
29 elastomer body
31 bearing pin
35 bracket wing
37 bracket wing
39 bearing bracket
41 bearing space
43 access opening
45 pin hole
47 pin head
49 weld nut
51 base wall
52 pin hole
53 support leg
55 base wall bottom edge
57 support leg bottom edge
59 base wall peripheral edge
61 base wall vertex
63 transition edge
65 free peripheral edge

67 support leg tab
69 trough bottom
71 mounting recess
73 trough edge
Q1, Q2, Q3 unit bearing
L bearing axis
Δz projection

The invention claimed is:

1. A subframe for a vehicle, with a unit bearing, in which a unit support is pivotably connected to a unit bearing on the subframe about a bearing axis, wherein the unit bearing is axially fastened on both sides to a respective bracket wing of a bearing bracket of the subframe, wherein the unit bearing is arranged in an inner corner region of the subframe at which a first subframe member and a second subframe member converge, and wherein one of the bracket wings is formed directly by a wall of the first subframe member, wherein the first subframe member is a hollow member which delimits a cavity which is closed in the hollow member cross section by means of a hollow member wall, and/or in that the first subframe member has an access opening on its frame outer side via which the unit bearing can be mounted/dismounted.

2. The subframe according to claim 1, wherein the other bracket wing is designed as a separate bracket wing component which is connected to the second subframe member, wherein the bracket wing component is spaced from the first subframe member via a bearing space in which the unit bearing is arranged, and wherein the first subframe member is a subframe cross member and the second subframe member is a subframe longitudinal member.

3. A subframe for a vehicle, the subframe comprising a first unit mounting, in which a unit support is pivotably connected to a unit bearing on the subframe about a bearing axis which is defined by a bearing pin which is mounted axially on both sides of the unit bearing in a bracket wing of a bearing bracket of the subframe, wherein at least one of the bracket wings is designed as a U-profile part with a base wall in which the bearing pin is mounted, and with support legs angled therefrom and which support the base wall relative to the subframe, wherein the bracket wing is connected to the subframe at its base wall bottom edge and at its support leg bottom edge by a weld, and in that the base wall is triangular in shape, namely with base wall peripheral edges which converge in a triangular shape at a rounded base wall vertex, in the region of which a bearing opening for the bearing pin is formed;

the subframe comprising a second unit mounting, a first longitudinal member on a first side of the subframe, and a second longitudinal member on a second side of the subframe opposite the first side, wherein the first unit mounting is located closer to the first side than the second side and wherein the second unit mounting is located closer to the second side than the first side; and the subframe further comprises a subframe cross member extending between the first longitudinal member and the second longitudinal member in a direction parallel to the bearing axis, wherein each of the first unit mounting and the second unit mounting abuts the subframe cross member, and wherein the first unit mounting and the second unit mounting are asymmetrical from one another.

4. The subframe according to claim 3, wherein at least one of the support legs is extended with a tab which projects beyond the base wall bottom edge with a projection, and in that the base wall bottom edge is connected to a frame inner side of the subframe and the support leg tab is connected to a frame upper side or frame lower side.

5. The subframe according to claim 3, wherein the two support legs are not parallel to each other, but are inclined towards each other in the direction of the base wall apex, thereby resulting in a compact and component-rigid bracket wing geometry, and/or in that the bracket wing is a formed sheet metal part.

6. A subframe, with a unit mounting, in which a unit support is pivotably connected to a unit bearing on the subframe about a bearing axis which is defined by a bearing pin which is mounted axially on both sides of the unit bearing in a bracket wing of a bearing bracket of the subframe, wherein a subframe member, namely a subframe cross member or a subframe longitudinal member, is formed by cross-section reduction of the subframe member, with a trough-shaped mounting recess in which the bracket wings are arranged, wherein the subframe member is a hollow member which delimits a cavity which is closed in the hollow member cross section by means of a hollow member wall in which the trough-shaped mounting recess is formed, and wherein the hollow member wall has a rectangular cross section in which an upper horizontal hollow member top wall and a lower horizontal hollow member bottom wall are connected at transition edges to vertical hollow member side walls, wherein the contour of one of the transition edges is interrupted by the trough-shaped mounting recess, and in that a trough bottom of the mounting recess merges at a recess edge into the side wall and into the bottom or top wall of the subframe member.

7. The subframe according to claim 4, wherein the two support legs are not parallel to each other, but are inclined towards each other in the direction of the base wall apex, thereby resulting in a compact and component-rigid bracket wing geometry, and/or in that the bracket wing is a formed sheet metal part.

8. The subframe according to claim 1, wherein the subframe further comprises a unit mounting in which a second unit support is pivotably connected to a second unit bearing on the subframe about a second bearing axis which is defined by a bearing pin which is mounted axially on both sides of the second unit bearing in a respective second bracket wing of a second bearing bracket of the subframe.

9. The subframe according to claim 8, wherein at least one second bracket wing of the respective second bracket wings is designed as a U-profile part with a base wall in which the bearing pin is mounted, and with support legs angled therefrom and which support the base wall relative to the subframe, wherein the at least one second bracket wing is connected to the subframe at a base wall bottom edge and at a support leg bottom edge, wherein the base wall is triangular in shape with base wall peripheral edges which converge in a triangular shape, wherein a bearing opening for the bearing pin is formed in a region of the triangular shape.

10. The subframe according to claim 9, wherein the at least one second bracket wing is connected to the subframe by welding, and wherein the triangular shape has a rounded base wall vertex.

11. The subframe according to claim 8, wherein at least one of the support legs is extended with a tab which projects beyond the base wall bottom edge with a projection.

12. The subframe according to claim 11, wherein the base wall bottom edge is connected to a frame inner side of the subframe and the support leg tab is connected to a frame upper side or frame lower side.

13. The subframe according to claim 8, wherein the two support legs are not parallel to each other, but are inclined towards each other in the direction of the base wall apex, thereby resulting in a compact and component-rigid bracket wing geometry.

14. The subframe according to claim 8, wherein the at least one second bracket wing is a formed sheet metal part.

15. The subframe according to claim 1, wherein the subframe further comprises a unit mounting in which a second unit support is pivotably connected to a second unit bearing on the subframe about a second bearing axis which is mounted axially on both sides of the second unit bearing in a respective second bracket wing of a second bearing bracket of the subframe, wherein a subframe member comprising one of a subframe cross member or a subframe longitudinal member is formed by cross-section reduction of the subframe member;

wherein the subframe member further comprises a trough-shaped mounting recess in which the respective second bracket wings are arranged;

wherein the subframe member is a hollow member which delimits a cavity which is closed in the hollow member cross section by a hollow member wall in which the trough-shaped mounting recess is formed, and wherein the hollow member wall has a rectangular cross section in which an upper horizontal hollow member top wall and a lower horizontal hollow member bottom wall are connected at transition edges to vertical hollow member side walls, wherein the contour of one of the transition edges is interrupted by the trough-shaped mounting recess, and wherein a trough bottom of the mounting recess merges at a recess edge into the side wall and into the bottom or top wall of the subframe member.

16. The subframe according to claim 15, wherein the two support legs are not parallel to each other, but are inclined towards each other in the direction of the base wall apex, thereby resulting in a compact and component-rigid bracket wing geometry.

17. The subframe according to claim 15, wherein the respective second bracket wings are formed sheet metal parts.

* * * * *